United States Patent
Fewkes et al.

(10) Patent No.: US 6,559,197 B2
(45) Date of Patent: May 6, 2003

(54) OPTICAL FIBER COATING

(75) Inventors: Edward J. Fewkes, Horseheads, NY (US); Gregory F. Jacobs, Elmira, NY (US); Michael J. Winningham, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/819,300

(22) Filed: Mar. 28, 2001

(65) Prior Publication Data

US 2003/0045600 A1 Mar. 6, 2003

Related U.S. Application Data

(60) Provisional application No. 60/200,800, filed on May 1, 2000.

(51) Int. Cl.[7] .............................. C08F 2/42; C08F 2/50
(52) U.S. Cl. ........................ 522/172; 522/25; 522/31; 522/32; 522/77; 522/79; 522/96; 522/90; 522/148; 522/173; 522/174; 522/182; 427/508; 427/513; 427/515; 427/517; 427/162; 427/163.2; 428/378; 428/388; 428/391; 428/394
(58) Field of Search .......................... 522/25, 31, 32, 522/77, 79, 83, 96, 148, 172, 174, 90, 182, 173; 427/508, 513, 515, 517, 518, 162, 163.2; 428/378, 388, 391, 394

(56) References Cited

U.S. PATENT DOCUMENTS

| | | |
|---|---|---|
| 4,076,380 A | 2/1978 | DiMarcello et al. |
| 4,176,911 A | 12/1979 | Marcatili et al. |
| 4,300,930 A | 11/1981 | Chang |
| 4,402,570 A | 9/1983 | Chang |
| 4,439,008 A | 3/1984 | Joormann et al. |
| 4,486,212 A | 12/1984 | Berkey |
| 4,608,409 A | 8/1986 | Coady et al. |
| 4,609,718 A | 9/1986 | Bishop et al. |
| 4,629,287 A | 12/1986 | Bishop |
| 4,690,502 A | 9/1987 | Zimmerman et al. |
| 4,798,852 A | 1/1989 | Zimmerman et al. |
| 4,962,992 A | 10/1990 | Chapin et al. |
| 5,104,433 A | 4/1992 | Chapin et al. |
| 5,352,712 A | 10/1994 | Shustack |
| 5,536,529 A | 7/1996 | Shustack |
| 5,539,014 A | 7/1996 | Swedo et al. |
| 5,639,846 A | 6/1997 | Shustack |
| 5,672,675 A | 9/1997 | Green et al. |
| 5,696,179 A | 12/1997 | Chawla |
| 5,729,645 A | 3/1998 | Garito et al. |
| 5,837,750 A | 11/1998 | Szum et al. |
| 6,187,834 B1 | 2/2001 | Thayer et al. |
| 6,207,728 B1 | 3/2001 | Sekiguchi et al. |

OTHER PUBLICATIONS

*Handbook of Pressure Sensitive Adhesive Technology*, 3rd Edition, pp. 36, 37, 57–61, 169, 173, 174 (1999).

Primary Examiner—James J. Seidleck
Assistant Examiner—Sama L. McClendon
(74) Attorney, Agent, or Firm—James V. Suggs; Timothy R. Krogh

(57) ABSTRACT

The invention disclosed includes a coating composition for siliceous surfaces. The coating includes at least one component from the group consisting of poly(alkoxy)silane, poly(halo)silane, alkoxysilane, halosilane, and mixtures thereof and a catalyst compound which generates a proton to hydrolyze the component when exposed to radiation. Preferably, the catalyst is a photo-acid. The invention also includes a method of coating the optical fiber. The aforementioned coating is applied to an exterior surface of the fiber. A proton is generated to promote the hydrolysis of the component. The invention further includes a method of accelerating adhesion between the exterior surface of the article and the coating. The inventive coating is applied to the surface of the fiber and the coating is exposed to a radiation source.

37 Claims, 1 Drawing Sheet

OPTICAL FIBER COATING

This application claims the benefit of U.S. Provisional Patent Application Ser. No. 60/200,800, filed May 1, 2000.

BACKGROUND OF THE INVENTION

1. Field of the Invention

The present invention relates generally to optical fibers, and particularly to the application of a coating to an exterior surface of the optical fiber.

2. Technical Background

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

The fibers used in local networks are directly exposed to harsh conditions, including severe temperature and humidity extremes. Since prior coatings for optical fibers did not perform well under such adverse conditions, the need existed for the development of higher performance coatings to address the wide and varied temperature and humidity conditions in which fibers are employed. Specifically, these coatings possessed thermal, oxidative, and hydrolytic stability which is sufficient to protect the encapsulated fiber over a long life-span (i.e., about twenty-five or more years).

Optical fibers typically contain a glass core, a cladding, and at least two coatings, i.e., a primary (or inner) coating and a secondary (or outer) coating. The primary coating is applied directly to the cladding and, when cured, forms a soft, elastic, and compliant material which encapsulates the glass fiber. The primary coating serves as a buffer to cushion and protect the glass fiber core when the fiber is bent, cabled, or spooled. Stresses placed upon the optical fiber during handling may induce microbending of the fibers and cause attenuation of the light which is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber, which can induce microbending and consequent inefficient signal transmission. This cushioning effect must be maintained throughout the fiber's lifetime.

Because of differential thermal expansion properties between the primary and secondary coatings, the primary coating must also have a glass transition temperature ($T_g$) which is lower than the foreseeable lowest use temperature. This enables the primary coating to remain soft throughout the temperature range of use, facilitating differences in the coefficient of thermal expansion between the glass fiber and the secondary coating.

It is important for the primary coating to have a refractive index which is different (i.e., higher) than the refractive index of the cladding. This refractive index differential between the cladding and the primary coating allows errant light signals to be refracted away from the glass core.

Finally, the primary coating must maintain adequate adhesion to the glass fiber during thermal and hydrolytic aging, yet be strippable therefrom for splicing purposes. Moisture resistance is essential, because moisture also affects the adhesion of the primary coating to the glass. Poor adhesion can result in various sized delaminations which may lead to microbending and which can be significant sources of attenuation in the optical fiber.

Known adhesion promoters react to form bonds between the glass substrate and the primary coating or coating adjacent the substrate. Coatings which include these promoters are moisture sensitive and require the absence of water in the coating when the coating is in the liquid phase. Thus rigorous efforts are necessary to maintain the liquid coatings free of water.

Also the shelf life of these coatings is an issue. A previous attempt to increase the shelf life of the liquid coatings was to include a slow to hydrolyze poly(alkoxy)silanes in the coating. However, these coatings required unacceptable aging periods to allow adhesion to develop between the cured coating and the fiber.

SUMMARY OF THE INVENTION

One aspect of the present invention is a coating composition for siliceous surfaces. The coating includes at least one component from the group consisting of poly(alkoxy) silane, poly(halo)silane, alkoxysilane, halosilane, and mixtures thereof and a catalyst compound which generates a proton to hydrolyze the component when exposed to radiation. Preferably, the catalyst is a photo-acid.

In another aspect, the present invention includes a method of coating the optical fiber. The aforementioned coating is applied to an exterior surface of the fiber. A proton is generated to promote the hydrolysis of the component.

A preferred embodiment of the invention includes a method of accelerating adhesion between the exterior surface of the article and the coating. The inventive coating is applied to the surface of the fiber and the coating is exposed to a radiation source.

The coating of the invention has exhibited good adhesion properties with improved shelf life of the formulated liquid coating prior to application of the coating to the fiber. The invention also has the advantage that less reactive silanes may be used as an adhesion promoter. Also, the adhesion promoter of the invention is more hydrolyticly stable and has exhibited excellent adhesion properties in wet environments.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
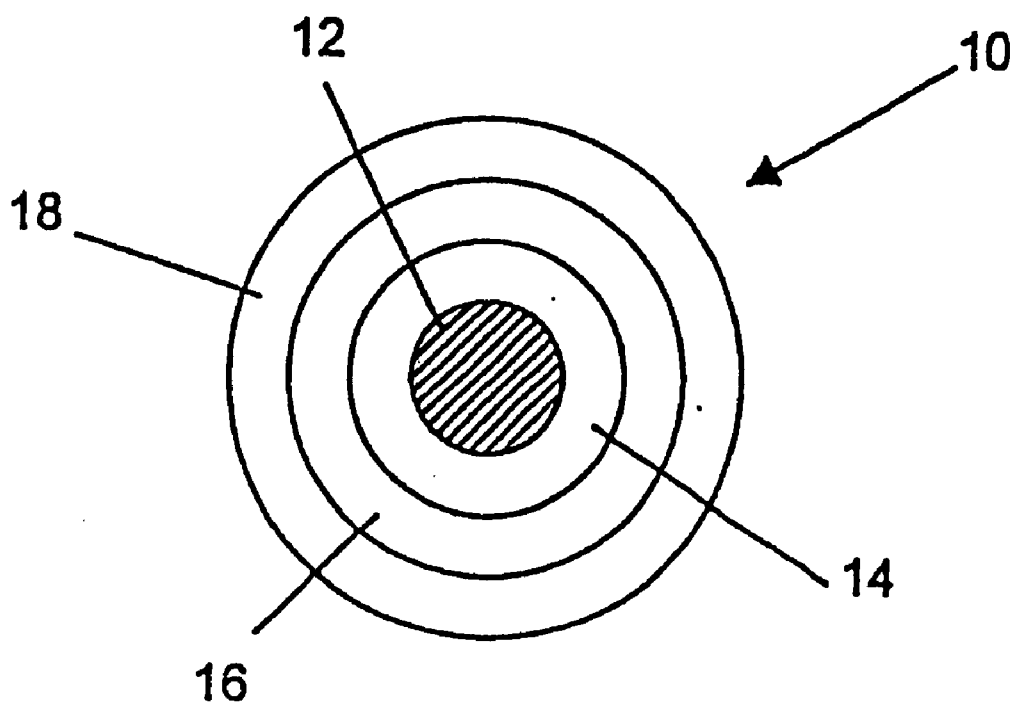
FIG. 1 is a cross sectional view of a coated optical fiber.

Reference will now be made in detail to the present preferred embodiment of the invention, an example of which is illustrated in the accompanying drawing. Wherever possible, the same reference numbers will be used throughout the drawings to refer to the same or like parts. An exemplary embodiment of the present invention is shown in FIG. 1, and is designated generally throughout by reference numeral 10.

Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16. Any conventional material can be used to form the glass core 12, such as those described in U.S. Pat. No. 4,486,212 to Berkey, which is hereby incorporated by reference. The core is typically a silica glass having a cylindrical cross section and a diameter ranging from about 5 to about 10 µm for single-mode fibers and about 20 to about 100 µm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties. Optional, fiber 10 may include an inner cladding (not shown) between core 12 and cladding 14.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The glass core 12 and cladding layer 14, which together form the glass fiber, can be formed according to a number of processes known in the art. In many applications, the glass core 12 and cladding layer 14 have a discernible core-cladding boundary. One such glass fiber is a step-index fiber, which is formed basically by applying the cladding layer 14 as a series of glass or plastic layers of varying refractive index. Exemplary step-index fibers are described in U.S. Pat. Nos. 4,300,930 and 4,402,570 to Chang, which are hereby incorporated by reference. Another such fiber is a graded-index fiber, which has a core whose refractive index varies with distance from the fiber. A graded-index fiber is formed basically by diffusing the glass core 12 and cladding layer 14 into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., which are hereby incorporated by reference. Alternatively, the core and cladding layer can lack a distinct boundary. The optical fibers of the present invention can contain these or any other core-cladding layer configuration now known or hereafter developed.

Preferably both coatings 16 and 18 are photopolymerizable coatings and not a thermoplastic resin or thermoset resin.

Typically, a major component of the coating composition of the present invention is an oligomer. Preferably the oligomer is an ethylenically unsaturated urethane or urea oligomer, more preferably the oligomeric component of the coating is an aliphatic polyether urethane acrylate. It is also preferred that the oligomer is capable of participating in addition polymerization.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Thus, it is desirable for the coating composition of the present invention to contain at least one ethylenically unsaturated oligomer, although more than one oligomer component can be introduced into the composition. Preferably, the oligomer(s) is present in the coating composition in an amount between about 10 to about 90 percent by weight, more preferably between about 30 to about 90 percent by weight, and most preferably between about 35 to about 60 percent by weight.

Examples of suitable ethylenically unsaturated oligomers are polyether urethane acrylate oligomers (e.g., CN986 available from Sartomer Company, Inc., (West Chester, Pa.), BR3731 and STC3-149 available from Bomar Specialties Co. (Winsted, Conn.), and Purelast566A available from Polymer Systems Corporation, (Orlando, Fla.)), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690, 502 and 4,798,852 to Zimmerman et al., U.S. Pat. No. 4,609,718 to Bishop, and U.S. Pat. No. 4,629,287 to Bishop et al., which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), epoxy acrylate oligomers (e.g., CN120 available from Sartomer Company, Inc., and Ebecryl 3201 and 3204 available from UCB Radcure), hydrogenated polybutadiene oligomers (e.g., Echo Resin MBNX available from Echo Resins and Laboratory (Versailles, Mo.)), and combinations thereof.

The primary coating compositions of the invention also include, in addition to the oligomer component, a monomeric component. Preferably, the monomer is an ethylenically unsaturated monomer, more preferably a (meth) acrylate monomer. Generally, suitable monomers are those for which the resulting homopolymer or mixtures of monomers would have a glass transition temperature ($T_g$) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional (meth)acrylates may also be employed.

When it is desirable to utilize moisture-resistant components, the monomer component will be selected on the basis of its compatibility with the selected moisture-resistant oligomer. Not all such liquid monomers may be successfully blended and co-polymerized with the moisture-resistant oligomers, because such oligomers are highly nonpolar. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the composition to contain at least one ethylenically unsaturated monomer, although more than one monomer can be introduced into the composition. Preferably, the monomeric component is present in the composition in an amount of about 5 to about 95 percent by weight, more preferably about 5 to about 60 percent by weight, most preferably, about 20 to about 50 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Henkel (Ambler, Pa.)), ethoxylatednonylphenol acrylate (e.g., SR504 available from Sartomer Company, Inc. and Photomer 4003 available from Henkel), phenoxyethyl acrylate (e.g., SR339 available from Sartomer Company, Inc., Ageflex PEA available from CPS Chemical Co., and Photomer 4035 available from Henkel), isooctyl acrylate (e.g., SR440 available from Sartomer Company, Inc. and Ageflex FA8 available from CPS Chemical Co.), tridecyl acrylate (e.g., SR489 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10available from CPS Chemical Co.), 2-(2-ethoxyethoxy)ethyl acrylate (e.g., SR256 available from Sartomer Company, Inc.), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 $\mu$m is, e.g., less than 1.0 J/cm$^2$, preferably less than 0.5 J/cm$^2$.

Suitable photoinitiators include bis acyl phosphine oxide in a blend or a pure form (e.g. Irgacure 1850 or Irgacure 819 available from Ciba Specialty Chemical, Hawthorne, N.Y.), 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, and 1700 available from Ciba Specialty Chemical), 2,2-dimethoxyl-2-phenyl acetophenone (e.g., Irgacure 651, available from Ciba Specialty Chemical), and combinations thereof.

As used herein, the weight percent of a particular component refers to the amount introduced into the bulk composition excluding an adhesion promoter and other additives. The amount of adhesion promoter and various other additives that are introduced into the bulk composition to produce a composition of the present invention is listed in parts per hundred. For example, a monomer, an oligomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

In accordance with the invention, coating 16 includes an adhesion promoter. The adhesion promoter has at least one component from the group consisting of poly(alkoxy)silane, poly(halo)silane, alkoxysilane, halosilane, and mixtures thereof and a catalyst compound which generates a proton to hydrolyze the component when exposed to radiation. Preferably upon exposure to radiation, the catalyst will generate a photon to hydrolyze the component. Suitable poly(alkoxy) silanes and alkoxysilanes include one or more carbon elements. Suitable halides include chlorine, fluorine, bromine, and iodine. It is preferred that the coating is adjacent an exterior surface of cladding 14, such as primary coating 16. However, the coating of the is not limited to a primary coating. In another embodiment of the invention, the adhesion promoter is a part of secondary coating 18.

It is preferred that the component of the coating is selected from the group consisting of poly(butoxy)silane, poly (ethoxy)silane, poly(methoxy)silanes, poly(chloro)silane, and combinations thereof. In one more preferred embodiment, the poly(alkoxy)silane is a triethoxysilane or a trimethoxysilane. However, the invention may practiced with a poly(alkoxy)silane that has more than one or two carbon elements. One particularly preferred poly(alkoxy) silane is 3-mercaptopropyltriethoxysilane (3-MPTMS, available from United Chemical Technologies (Bristol, Pa.)). Another particularly preferred poly(alkoxy)silane is bis(trimethoxy silylethyl) benzene (available from Gelest (Tullytown, Pa.)).

In a preferred embodiment the weight percent of the component is about 0.1 to about 10, more preferably between about 0.25 to about 4 parts per hundred, most preferably between about 0.5 to about 3 parts per hundred.

Preferably, the catalyst compound is a photo-acid, and the radiation is one selected from the group consisting of actinic radiation, UV radiation, and visible radiation. Any example of a photo-acid is a molecule which upon exposure to light (photonic radiation) reacts to form an acidic specie. The acidic specie is preferably a Lewis Acid or a Lowry-Brønsted acid.

Preferred photo-acids include of triarylsulfonium salts, diaryliodonium salts, diaryldiazonium salts, phosphonium salts, antimonium salts, arsenous salts, nitrobenzyl esters, and combinations thereof. A particularly preferred photo-acid is triarylsulfonium hexafluorophosphate. An example of a suitable antimonium salt is antimony-hexafluoride ($SbF_6$). An example of a suitable arsenous salt is arsenic-hexafluoride ($AsF_6$). In a preferred embodiment of the coating, the weight percent of the photo-acid is about 0.001 to about 5.0. It is also preferred that the catalyst is in the same coating as the adhesion promoter.

Two sample mechanisms for the hydrolysis of an exemplary ethoxysilane is shown below in A.

(A) Acid-Catalyzed Hydrolysis of Ethoxysilanes

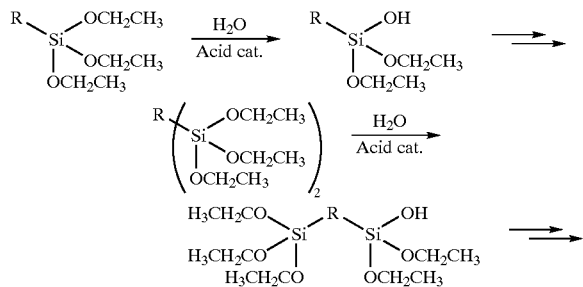

The accepted mechanism for photo-generation of strong acids from triarylsulfonium salts, such as triarylsulfonium hexafluorophosphate, is shown in B. In this case an acid, $HPF_6$, is generated upon exposure to UV radiation.

(B) Photo-Generation of an Acid

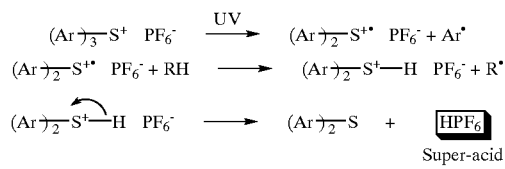

Super-acid

Optionally, a carrier additive may also be used with the adhesion promoter. The carrier is preferably a carrier which functions as a carrier surfactant, ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 5 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200 or Tegorad 2700 (acrylated siloxane).

Other classes of suitable carriers are polyols and non-reactive surfactants. Examples of suitable polyols and non-reactive surfactants include polyol Aclaim 3201 (poly (ethylene oxide-co-propylene oxide)) available from Lyondell (formerly known as Arco Chemicals), Newtown Square, Pa. and non-reactive surfactant Tegoglide 435 (polyalkoxy-polysiloxane) available from Goldschmidt Chemical Co. The polyol or non-reactive surfactant may be present in a preferred amount between about 0.01 pph to about 10 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A common example of an ambiphilic molecule is soap. A tackifier modifies the time-sensitive rheological property of a polymer product. In general, a tackifier will make a polymer product act stiffer at higher strain rates or shear rates and will make the polymer product softer at low strain rates or shear rates. A tackifier is commonly used in the adhesives industry and enhances the ability of a coating to create a bond with an object that the coating is applied upon. For additional background regarding tackifiers, the *Handbook of Pressure Sensitive Adhesive Technology*, $3^{rd}$ Edition, is incorporated herein by reference, see pages 36, 37, 57–61, 169, 173, and 174.

One particular suitable tackifier is Uni-tac® R-40 (hereinafter "R-40") available from International Paper Co., Purchase, N.Y. R-40 is a tall oil rosin and is from the chemical family of abietic esters. R-40 contains a polyether segment. Preferably, the tackifier is present in the composition in an amount between about 0.01 to about 10 parts per hundred, more preferred in the amount between about 0.05 to about 10 parts per hundred.

In addition to the above-described components, the primary coating composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is bis hindered phenolic sulfide or thiodiethylene bis(3,5-di-tert-butyl)-4-hydroxyhydrocinnamate (e.g., Irganox 1035, available from Ciba Specialty Chemical).

Examples of suitable primary coatings which may be used to practice the invention are disclosed in U.S. patent application granted serial No. 60/173,828, filed Dec. 30, 1999, and U.S. patent application granted serial No. 60/174,008, filed Dec. 30, 1999. However, the invention is not limited to the primary coatings cited in the applications. The above mentioned U.S. patent applications are incorporated herein by reference in their entirety.

The secondary coating material(s) 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are described in U.S. Pat. Nos. 4,962,992 and 5,104,433 to Chapin, and U.S. Pat. No. 5,837,750 to Szum et al. and U.S. patent application granted serial No. 60/173,874, filed Dec. 30, 1999, which are hereby incorporated by reference. Various additives that enhance one or more properties of the coating can also be present, including the above-mentioned additives incorporated in the compositions of the present invention.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

The components of the optical fiber of the present invention can optionally include a coloring material, such as a pigment or dye, or an additional colored ink coating.

The optical fibers of the present invention can also be formed into a optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. Preferably the matrix material is the polymerization product of the composition used to form the secondary coating material.

The invention also includes a method of coating an optical fiber. A coating having the aforementioned component and catalyst is applied to an exterior surface of the fiber, preferably an exterior surface of cladding 14. A proton from the catalyst is generated to promote the hydrolysis of the component. It is preferred that the proton is generated exposing the coating to radiation. Preferred types of radiation are listed above.

The hydrolysis of the component forms a chemical bond or strong association between the coating and the exterior fiber surface of the glass article. The chemical bond may be formed by one of the following bonding techniques free radical polymerization, cationic polymerization, and mixtures thereof.

The invention also includes a method of accelerating adhesion between an exterior surface of a glass article and the coating. This aspect of the invention could also be described as a method of accelerating the coupling between the coating and the glass article. The method includes applying the coating having at least one component and the catalyst to the exterior surface of the glass article. Preferably, the coating is subsequently exposed to UV or visible radiation. Exposing the coating to radiation includes generating a catalytic proton to hydrolyze the component. In a preferred embodiment of the method, the glass article is an optical fiber and the coating is a primary coating.

EXAMPLE

The invention will be further illustrated by the following examples which are intended to be exemplary of the invention. A primary coating which contained the photo-acid triarylsulfonium hexafluorophosphate and 3-mercaptopropyltriethoxysilane as an adhesion promoter package was formulated. The formulation composition is shown in Table 1. The primary coating was applied to the fiber and overcoated with a secondary coating.

TABLE 1

Primary Coating Formulation

| Component | Trade Name/Chemical Name | wt % or pph |
|---|---|---|
| Oligomer | BR3731 | 52% |
| Monomer | Photomer4003 | 45% |
| Photoinitiator | Irgacure1850 | 3% |
| Antioxidant | Irganox1035 | 1 pph |
| Photoacid | CD1101 | 1 pph |
| Adhesion Promoter | 3-mercaptopropyltriethoxysilane | 1 pph |

BR3731 = aliphatic polyether urethane acrylate oligomer, Bomar Specialties Co.; Photomer4003 = ethoxylatednonylphenol acrylate, Henkel; Irgacure1850 = BAPO photoinitiator blend, Ciba Specialty Chemicals; Irganox1035 = thiodiethylene bis(3,5-di-tert-butyl-4-hydroxyhydrocinnamate), Ciba Specialty Chemicals; CD1101 = 50% triarylsulfonium hexafluorophosphate in propylene carbonate, Sartomer Co.

The fiber was proof tested (a.k.a. tensile tested) at 100 kpsi and was checked for defects. The procedure to proof test the fiber includes continuously elongating the entire length of the fiber with a one (1%) percent strain. This elongation of the fiber causes any defects to increase and become apparent. Any example of a suitable defect is a crack in the fiber coating.

Fiber samples were placed in room temperature and 65° C. water after 7 and 14 day aging periods. The fibers were allowed to soak in water for two weeks. The fibers were analyzed by microscopic inspection. The fibers were evaluated for water delaminations and microscopic interfacial separations (MIS). After soaking in the water for two weeks, no delamination or MIS was observed. The results of the test are summarized in table 2.

TABLE 2

Fiber Water Soak Results for Fiber.

| Fiber Age/Days Soaked/temp. | # Delaminations or MIS |
|---|---|
| 7 day/14 day/room temp. | 0 |
| 7 day/14 day/65° C. | 0 |
| 14 day/14 day/room temp. | 0 |
| 14 day/14 day/65° C. | 0 |

The adhesion promoter package which contained the photo-acid and the poly(alkoxy)silane was effective in maintaining good adhesion of between the primary coating and the glass surface under wet environments.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coating composition for siliceous surfaces comprising: a free radical-curable composition including
   at least one silane component selected from the group consisting of
      poly(alkoxy)silane, alkoxysilane, halosilane, poly(halo)silane, and mixtures thereof, the silane component having a concentration of about 10 pph or less;
   a free radical photoinitiator; and
   a catalyst compound which generates a proton to hydrolyze said silane component when exposed to radiation.

2. The composition of claim 1 wherein said catalyst compound comprises a photo-acid.

3. The composition of claim 1 wherein said radiation is one selected from the group consisting of actinic radiation, UV radiation, and visible radiation.

4. The composition of claim 1 wherein said silane component comprises one selected from the group consisting of poly(ethoxy)silane, poly(methoxy)silane, poly(chloro)silane, and combinations thereof.

5. The composition of claim 1 wherein the silane component is a poly(alkoxy)silane, and said poly(alkoxy)silane comprises a triethoxysilane.

6. The composition of claim 1 wherein the silane component is a poly(alkoxy)silane, and said poly(alkoxy)silane comprises 3-mercaptopropyltrimethoxysilane.

7. The composition of claim 2 wherein said photo-acid is one selected from the group consisting of triarylsulfonium salts, diaryliodonium salts, diaryldiazonium salts, phosphonium salts, antimonium salts, arsenous salts, nitrobenzyl esters, and combinations thereof.

8. The composition of claim 2 wherein said photo-acid comprises triarylsulfonium hexafluorophosphate.

9. The composition of claim 2 wherein said photo-acid is present in a concentration of about 0.001 to about 5.0 weight percent.

10. The composition of claim 9 wherein said photo-acid is present in a concentration of about 0.01 to about 2.0 weight percent.

11. The composition of claim 9 wherein said photo-acid is present in a concentration of about 1.0 weight percent.

12. The composition of claim 1 wherein said silane component is present in a concentration of about 0.1 to about 10 weight percent.

13. The composition of claim 12 wherein said silane component is present in a concentration of about 0.5 to about 5.0 weight percent.

14. The composition of claim 12 wherein said silane component is present in a concentration of about 1 weight percent.

15. The composition of claim 1 wherein said silane component comprises bis(triethoxysilylethyl)benzene.

16. An optical fiber comprising a primary coating in accordance with claim 1.

17. A method of coating an optical fiber, the optical fiber having an exterior surface, the method comprising the steps of:
   applying a free radical curable composition to an exterior surface of the fiber, the free radical curable composition including
      at least one silane component selected from the group consisting of
         poly(alkoxy)silane, alkoxysilane, halosilane, poly(halo)silane, and mixtures thereof, the silane component having a concentration of about 10 pph or less,
      a free radical photoinitiator, and
      a catalyst compound which generates a proton to hydrolyze said silane component when exposed to radiation; and
   exposing the free radical curable composition to radiation, thereby generating a proton from the catalyst to promote the hydrolysis of the silane component.

18. The method of claim 17 wherein said exposing step cures the free radical curable composition.

19. A method of accelerating adhesion between an exterior surface of a glass article and a coating comprising the steps of:
   applying to the exterior surface a free radical curable coating composition including
      at least one silane component selected from the group consisting of a
         poly(alkoxy)silane, a poly(halo)silane, an alkoxysilane, a halosilane, and mixtures thereof, the silane component having a concentration of about 10 pph or less,
      a free radical photoinitiator, and
      a catalyst compound which generates a proton to hydrolyze the silane component when exposed to radiation; and
   exposing the coating composition to UV or visible radiation.

20. The method of claim 19 wherein the catalyst comprises a photo-acid.

21. The method of claim 19 wherein the glass article is an uncoated optical fiber, and the coating is a primary coating.

22. A method of improving shelf life of a radiation curable coating composition for siliceous surfaces, the composition including a free radical photoinitiator, the method comprising the steps of:
   adding a photo-acid to the free radical curable coating composition, the free radical curable coating composition including
      at least one silane component selected from the group consisting of a poly(alkoxy)silane, a poly(halo)silane, an alkoxysilane, a halosilane, and mixtures thereof, the silane component having a concentration of about 10 pph or less.

23. The method of claim 22 wherein the photo-acid comprises one selected from the group consisting of triarylsulfonium salts, diaryliodonium salts, diaryldiazonium salts, phosphonium salts, antimonium salts, arsenous salts, nitrobenzyl esters, and combinations thereof.

24. The method of claim 22 wherein the photo-acid comprises about 0.001 to about 5.0 weight percent of the coating.

25. The method of claim 22 wherein the component comprises one selected from the group consisting of poly(ethoxy)silane, poly(methoxy)silane, poly(chloro)silane, and combinations thereof.

26. The composition of claim 1 wherein the free-radical curable composition further includes
   at least one ethylenically unsaturated oligomer; and
   at least one ethylenically unsaturated monomer.

27. The composition of claim 26 wherein the at least one ethylenically unsaturated oligomer includes a urethane acrylate oligomer or a urea acrylate oligomer.

28. The composition of claim 26 wherein the at least one ethylenically unsaturated monomer includes a (meth) acrylate-functional monomer.

29. The composition of claim 1 wherein the free radical-curable composition is a (meth)acrylate-functional composition.

30. The method of claim 17 wherein the free-radical curable composition further includes
   at least one ethylenically unsaturated oligomer; and
   at least one ethylenically unsaturated monomer.

31. The method of claim 30 wherein the at least one ethylenically unsaturated oligomer includes a urethane acrylate oligomer or a urea acrylate oligomer.

32. The method of claim 30 wherein the at least one ethylenically unsaturated monomer includes a (meth) acrylate-functional monomer.

33. The method of claim 17 wherein the catalyst compound comprises a photo-acid.

34. The method of claim 33 wherein the photo-acid is selected from the group consisting of triarylsulfonium salts, diaryliodonium salts, diaryldiazonium salts, phosphonium salts, antimonium salts, arsenous salts, nitrobenzyl esters, and combinations thereof.

35. The method of claim 34 wherein the photo-acid is present in a concentration of about 0.001 to about 5.0 weight percent.

36. The method of claim 17 wherein the silane component is present in a concentration of about 0.5 to about 5.0 weight percent.

37. The method of claim 17 wherein the free radical curable composition is a (meth)acrylate-functional composition.

* * * * *